April 5, 1927.
L. G. SHINN
INCLINATION INDICATOR
Filed May 29, 1926
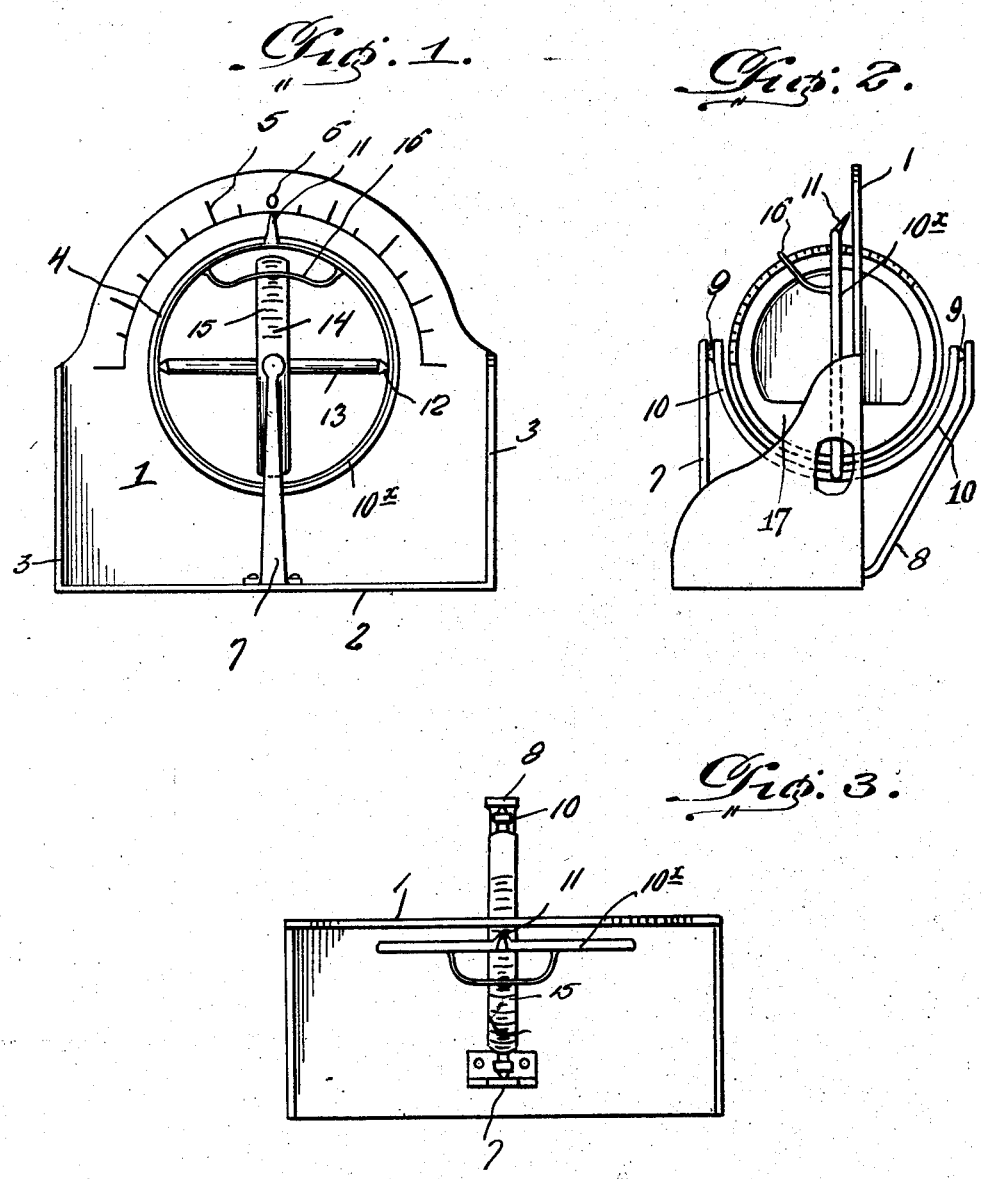
Inventor
L. G. Shinn
By Clarence A. O'Brien
Attorney Patented Apr. 5, 1927.

1,623,750

UNITED STATES PATENT OFFICE.

LUTHER G. SHINN, OF HOLDENVILLE, OKLAHOMA.

INCLINATION INDICATOR.

Application filed May 29, 1926. Serial No. 112,645.

My present invention pertains to inclination indicators, and consists in the simple, inexpensive and efficient inclination indicator hereinafter described and definitely claimed.

In the accompanying drawings, forming part of this specification:—

Figure 1 is a front elevation of the preferred embodiment of my invention.

Figure 2 is a side elevation of the same.

Figure 3 is a top plan view of the indicator.

Similar numerals of reference designate corresponding parts in all of the views of the drawings.

Among other elements my novel indicator comprises a frame plate 1 equipped with flanges 2 and 3, the flange 2 constituting a bottom and the flanges 3 constituting side walls. The said frame plate 1 is provided with an opening 4 and is equipped on its face and concentric with said opening with a scale 5 which is shown as describing a part of a circle. Manifestly within the purview of my invention, the graduated scale 5 may be extended entirely about the opening 4, but this extension I have deemed it unnecessary to illustrate.

The zero point of the scale 5 is designated by 6.

Carried by the frame alluded to are spaced standards 7 and 8, the said standards 7 and 8 serving as bearings for diametrically opposite trunnions 9 on arcuate arms 10 which are fixed to and extend at right angles from a ring 10$^x$. The said ring 10$^x$ is disposed in a plane in front of the plane of the frame plate 1 and is adapted to swing edgewise in a plane parallel to the frame plate 1 and is equipped at 11 with a pointer for cooperation with the graduated scale 5 in indicating sidewise inclination of the device equipped with the inclination indicator.

It will be gathered from the foregoing that the ring 10$^x$, and the arms 10 are adapted to swing as a unit in the direction indicated.

Journaled at diametrically opposite points 12 in the ring 10$^x$ are the outer ends of trunnions 13 carried by a wheel 14 disposed in the ring 10$^x$ and rotatable at right angles to the line of movement of said ring 10$^x$. The said wheel 14 is provided on its periphery with a graduated scale 15, and the ring 10$^x$ is equipped at 16 with a hair line pointer designed to cooperate with the peripheral graduations 15 of wheel 14 to indicate the longitudinal inclination of the device bearing the indicator. As best shown in Figure 2, the wheel 14 is provided at 17 with a proportionately heavy portion or weight, said weight operating when the device bearing the indicator is level to hold the zero point of the scale 15 in coincidence with the hair line pointer 16.

It will be apparent from the foregoing that my novel indicator is extremely simple and inexpensive in construction, and yet is reliable in indicating both the transverse and the longitudinal inclination of the aeroplane, automobile, boat or other device equipped with the indicator.

Incident to the swinging of the ring 10$^x$ in a plane parallel to the plate 1, the pointer 11 is designed to describe an arcuate circle and cooperate with the arcuate scale 5 in indicating inclination in the direction of the width of the device equipped with the indicator, and it will also be understood that the wheel 14 which is rotatable in a direction at right angles to the line of movement of the ring 10$^x$ is designed to cooperate with the pointer 16 on the ring 10$^x$ in indicating inclination in a longitudinal direction of the device equipped with my novel indicator.

I would also have it understood that when deemed expedient, my novel indicator may be encased in such manner as to protect its parts against foreign substance while fully displaying the positions of the two pointers alluded to, and their respective graduated scales.

I have entered into a detailed description of the construction and relative arrangement of the parts embraced in the present and preferred embodiment of my invention in order to impart a full, clear and exact understanding of the said embodiment. I do not desire, however, to be understood as limiting myself to the precise construction disclosed, my invention being defined by my appended claim within the scope of which modifications may be made without departure from my invention.

Having described my invention, what I claim and desire to secure by Letters-Patent, is:—

An inclination indicator comprising a frame having a plate and an opening in said plate and also having an arcuate graduated scale on the face of the plate concentric with said opening, standards carried by the frame and disposed at opposite sides of and spaced from said plate, a ring swingable edgewise in a plane parallel to the plate and having arcuate arms terminating in trunnions journaled in said standard and also having a pointer arranged to cooperate with said arcuate scale, a second pointer carried by said ring, said pointer being in the form of a hair line connected at its ends to spaced points of the ring, and a wheel disposed in said ring and having trunnions journaled at opposite points therein and also having a proportionately heavy portion; the said wheel being disposed and movable at right angles to the ring and being provided at its periphery with a graduated scale for cooperation with said second pointer on the ring.

In testimony whereof I affix my signature.

LUTHER G. SHINN.